United States Patent [19]

Horie

[11] Patent Number: 4,909,300
[45] Date of Patent: Mar. 20, 1990

[54] FLUID-PERMEABLE ARTICLE PRODUCING METHOD

[75] Inventor: Takao Horie, Gifu, Japan

[73] Assignee: Nabeya Iron & Tool Works, Ltd., Japan

[21] Appl. No.: 302,257

[22] Filed: Jan. 27, 1989

Related U.S. Application Data

[62] Division of Ser. No. 108,429, Oct. 14, 1987, Pat. No. 4,833,106.

[30] Foreign Application Priority Data

Oct. 16, 1986 [JP] Japan ................................. 61-24360

[51] Int. Cl.⁴ ............................................. B22D 19/00
[52] U.S. Cl. ...................................... 164/69.1; 164/98; 164/97
[58] Field of Search ...................... 164/91, 97, 98, 100, 164/101, 102, 103, 104, 105, 106, 112, 69.1; 29/423, 424

[56] References Cited

U.S. PATENT DOCUMENTS

| | | | |
|---|---|---|---|
| 2,904,863 | 9/1959 | Schmid | 164/105 |
| 3,177,574 | 4/1965 | Kuchek | 164/101 |
| 3,431,970 | 3/1969 | Olstowski et al. | 164/97 |
| 3,523,766 | 8/1970 | Markus et al. | 164/95 |
| 3,616,841 | 11/1971 | Walz | 164/34 |
| 3,781,170 | 12/1973 | Nakao et al. | 75/232 |
| 3,904,377 | 9/1975 | Honda et al. | 428/539.5 |
| 4,308,233 | 12/1981 | Narumiya et al. | 422/169 |

FOREIGN PATENT DOCUMENTS 2010711 7/1979 United Kingdom .

Primary Examiner—Richard K. Seidel
Attorney, Agent, or Firm—Oliff & Berridge

[57] ABSTRACT

A fluid-permeable article which permits fluid to pass therethrough includes a porous ceramic structure having a multiplicity of hollow members made of ceramic material which are concatenated with each other to form a framework having a continuous capillary passageway system. A continuous space is formed outside of the framework and is defined by the outer surfaces of the hollow members. A continuous matrix material fills the continuous space outside of the framework and cooperates with the porous ceramic structure to provide an integral composite structure consisting of the ceramic material and the matrix material. The continuous passageway system is open in at least a portion of the exposed surfaces of the article and permits fluids to pass therethrough.

4 Claims, 3 Drawing Sheets

FLUID-PERMEABLE ARTICLE PRODUCING METHOD

This is a division of application Ser. No. 07/108,429, filed Oct. 14, 1987, now U.S. Pat. No. 4,833,106.

BACKGROUND OF THE INVENTION

1. Field of the Invention

The present invention relates to a novel fluid-permeable article or product and a method for producing such an article, and more particularly to a method suitable for producing a novel cast product having continuous pores which permit a fluid to pass therethrough, without any metallurgical or mechanical treatment.

2. Discussion of the Prior Art

Various cast articles of iron, steel, copper alloy, aluminum alloy or other material are widely used for machine tools and general industrial machine equipment and for other applications. Such cast articles are produced by pouring a suitable molten metal into a cavity formed in a casting mold, and solidifying the cast metal melt.

The metal product thus produced by molding are subjected to post-casting treatments such as machining, grinding, lining, heat treatment, mechanical or chemical treatments, and various other treatments, depending upon the applications of the metal castings, in order to improve the properties of the products as cast.

In the field of metal casting as indicated above, it is known to use a core placed within a casting mold, for producing a hollow article which has a cylindrical hole corresponding to the core, for example. While it is possible to cast such a hollow article by using a core, no methods have been proposed for providing the hollow article with a three-dimensional porous structure which has continuous capillary pores as formed in a sintered metal article, and which permits a fluid to pass therethrough. Further, it is recognized that such continuous capillary pores are very difficult to form by any post-casting machining operations.

Thus, it has been extremely difficult to cast a porous structure having a continuous network of capillary pores, which may be used as an oil-impregnated bearing or ring for textile machinery, for example, wherein a lubricant is accommodated within the continuous network of the capillary pores in the porous structure. On the other hand, a cast iron base for a machine tool is required to have an air-permeable porous structure, when the machine base is designed as a pneumatically hovering or levitating member. In this case, the cast machine base must be subjected to a number of time-consuming and difficult drilling operations to form therein a multiplicity of mutually communicating small holes.

SUMMARY OF THE INVENTION

The present invention was developed in the light of the prior art situations indicated above. It is therefore a first object of the present invention to provide a novel metal article, in particular, a metal casting, which has continuous passageways formed therein to permit a fluid to pass therethrough.

It is a second object of the invention to provide a method suitable for producing such a porous cast metal article, without any metallurgical or mechanical treatments.

The first object may be achieved according to one aspect of the present invention, which provides a fluid-permeable article which permits a fluid to pass therethrough, comprising: a porous ceramic structure consisting of a multiplicity of hollow members which are made of a ceramic material and which are concatenated with each other so as to form a framework having therein a continuous capillary passageway system, the porous ceramic structure having a continuous space which is formed outside the framework of the hollow members and which is defined by outer surfaces of the hollow members; and a matrix material filling the continuous space defined outside the above-indicated framework of the ceramic porous structure. The matrix material forms a continuous matrix which cooperates with the porous ceramic structure to provide an integral composite structure consisting of the ceramic material and the matrix material. The continuous capillary passageway system is open in at least a portion of exposed surfaces of the article, and permits the fluid to flow therethrough.

The fluid-permeable article of the present invention constructed as described above has the continuous capillary passageway system formed within the framework of the mutually concatenated hollow members of the porous ceramic structure, which framework is typically a three-dimensional network of the ceramic material. The capillary passageway system permits the fluid to flow or pass therethrough. This type of article having such a fluid-permeable porous ceramic structure has not been available up to the present. In other words, the porous ceramic structure of the instant article allows free permeation or flow through the passageway system and even distribution therein, of a desired fluid such as air, other gases, cold or hot water, and oil. Accordingly, the instant fluid-permeable article can be widely used as various machine components which are adapted to use such a fluid for a specific purpose. Thus, the present invention provides increased freedom of design of the fluid-permeable machine components.

The framework of the hollow members of the porous ceramic structure may preferably consists of a three-dimensional network of the ceramic material. In this case, the three-dimensional network of the ceramic material is generally formed by a process which includes the steps of preparing a foamed body of a synthetic resin having a three-dimensional porous network structure, applying an unfired ceramic material to the foamed body, so as to surround the three-dimensional porous network structure, and firing the unfired ceramic material while burning out the porous network structure of the synthetic resin, so that the three-dimensional network of the framework of the porous ceramic structure is formed by the fired ceramic material, such that the continuous capillary passageway system corresponds to the burned-out porous network structure of the synthetic resin.

According one feature of the invention, the matrix material consists of a cast metal, which may be a cast iron or a cast steel.

The second object of the invention may be attained, according to another aspect of the invention, which provides a method of producing a fluid-permeable article which permits a fluid to pass therethrough, comprising the steps of: preparing a casting mold having a cavity; preparing a porous ceramic structure consisting of a multiplicity of hollow members which are made of a ceramic material and which are concatenated with each other so as to form a framework having therein a continuous capillary passageway system, the porous ceramic structure having a continuous space which is formed outside the framework of the hollow members and which is defined by outer surfaces of the hollow members; placing the porous ceramic structure in position within the cavity of the casing mold; pouring a molten metal into the cavity so as to fill the continuous space formed outside the framework of the porous ceramic structure, and allowing solidification of a mass of the poured molten metal within the continuous space, together with a mass of the molten metal surrounding the porous ceramic structure within the cavity, to thereby form a cast product as the fluid-permeable article wherein the porous ceramic structure is integrally embedded within the mass of the solidified cast metal, with the continuous capillary passageway system left within the framework of the porous ceramic structure.

According to the instant method, the fluid-permeable article can be readily obtained with high productivity, by utilizing a conventional casting technique, without the cast product being subjected to any metallurgical or mechanical treatments.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
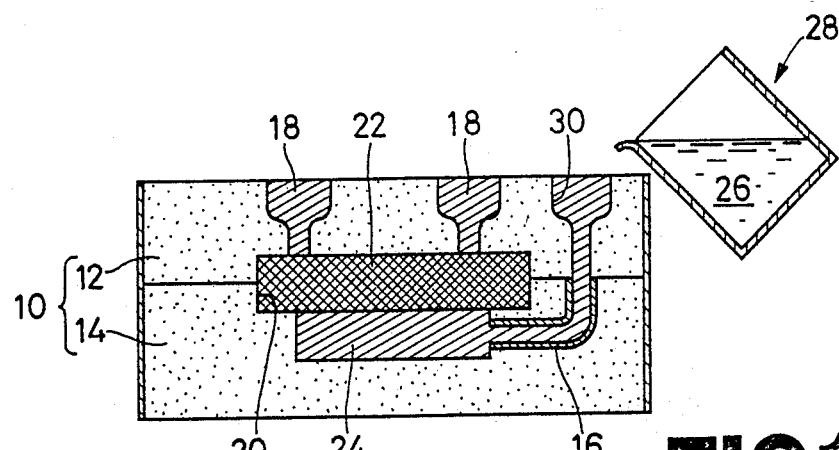
FIG. 1 is a cross sectional explanatory view showing one step of a method for producing a fluid-permeable cast article according to one embodiment of the present invention.
Figure 2:
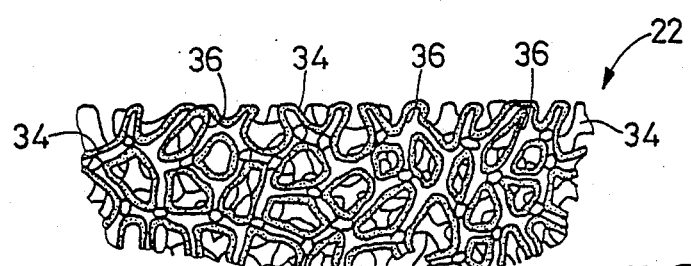
FIG. 2 is a fragmentary enlarged view in cross section of a part of an example of a porous ceramic structure used in the present method.
Figure 3:
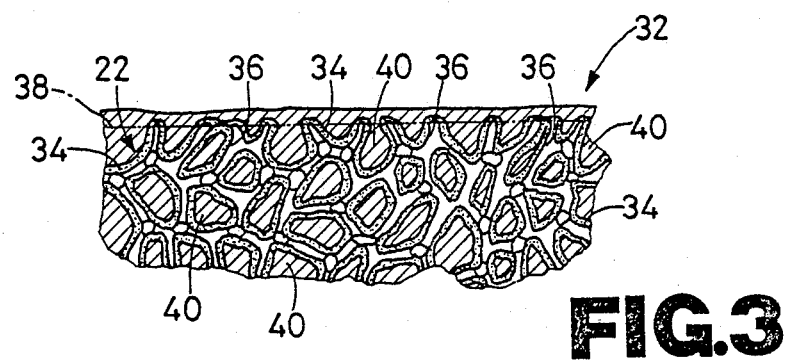
FIG. 3 is a fragmentary enlarged view of an intermediate cast product obtained according to the present method.
Figure 4:
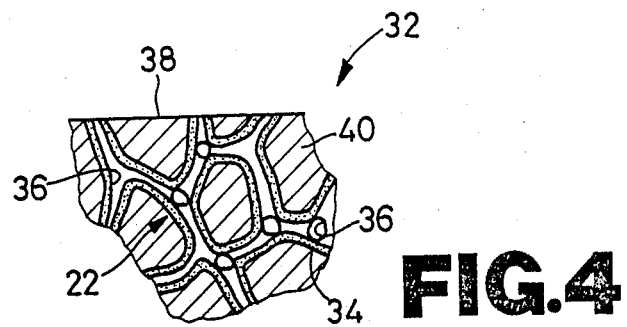
FIG. 4 is an enlarged view illustrating a part of the cast article obtained as an end product from the intermediate cast product of FIG. 3.
Figure 5:
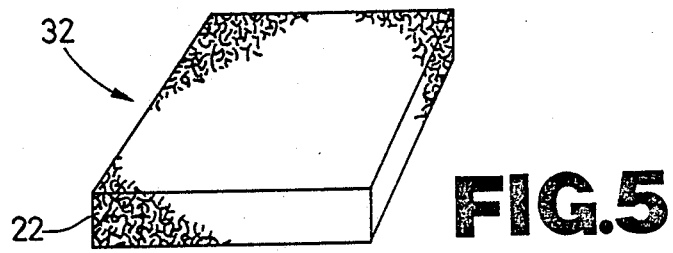
FIG. 5 is a perspective view of the cast end product.

A fluid-permeable article having a continuous three-dimensional capillary passageway system as shown in FIGS. 3-5 can be easily produced according to the present invention, by first placing in position a porous ceramic structure as shown in FIG. 2, within a casting mold as illustrated in FIG. 1, by way of example only, and subsequently pouring a molten metal into the mold. The thus obtained cast article is permeable to a fluid.

In FIG. 1, the casting mold is indicated by reference numeral 10. The mold 10 consists of an upper section 12 and a lower section 14, and is usually a greensand mold, or a self-hardening mold using a resin as a hardening medium. However, the casting mold 10 may be a permanent mold (made of a metallic material). The casting mold 10 has a ceramic runner 16, feedheads or risers 18, and a cavity 20 formed to accommodate the porous ceramic structure 22. The porous ceramic structure 22 set in the cavity 20 has a framework made of a suitable ceramic material, which has a three-dimensional network structure, as described below. the casting mold 10 further has a reservoir 24 formed just below the cavity 20 in communication therewith, and a pouring gate or in-gate 30 communicating with the reservoir 24. A molten metal 26 is poured from a ladle 28 into the gate 30.

In the present embodiment, the entire volume of the cavity 20 is occupied by the porous ceramic structure 22 as shown in FIG. 1 so that a cast product 32 as shown in FIG. 5 to be obtained has substantially the same volume as the porous ceramic structure 22 or the cavity 20. However, it is to be understood that the position of the ceramic structure 22 within the cavity 20, and the configuration of the ceramic structure 22 are not limited to those illustrated in FIG. 1, but may be suitably changed, depending upon the desired size and shape of the end product 32. For instance, the porous ceramic structure 22 may be positioned within the cavity 20, by suitable fixtures such as chaplets, such that some of the outer surfaces of the ceramic structure 22 are spaced apart from the inner surfaces of the mold 10 defining the cavity 20.

The porous ceramic structure 22 thus positioned within the mold cavity 20 has a multiplicity of hollow members 34 as indicated in FIG. 2. The hollow members 34 are concatenated with each other, so as to form a framework having a three-dimensional network structure. Each of the hollow members 34 has a capillary or small-diameter passage (36), so that the three-dimensional framework of the concatenated hollow members 34 has a continuous three-dimensional capillary system. The porous ceramic structure 22 has a continuous space which is formed outside the three-dimensional framework. In other words, this continuous space is defined by the outer surfaces of the individual hollow members 34. For example, the porous ceramic structure 22 may be obtained by: preparing a foamed body of a synthetic resin such as polyester urethane rubber or polyurethane having a three-dimensional porous network structure; removing, by a compressed air or other means, relatively thin films of the resin which close the voids left in the network structure of the foamed body; applying an unfired or green ceramic material (for example, in the form of a slurry) to the foamed resin body, so as to surround or coat the three-dimensional porous network structure of the foamed body; and drying and firing the applied green ceramic material, while burning out the porous network structure of the resin, so that the three-dimensional network of the porous ceramic structure 22 is formed by the fired ceramic material, such that the continuous capillary passageway system consisting of the capillaries 36 corresponds to the burned-out porous network structure of the synthetic resin. The ceramic material used to form the porous ceramic structure 22, that is, the ceramic material applied to the foamed body of the synthetic resin may be cordierite, alumina, SiC, mullite, zirconia or similar ceramic materials, which are selected depending upon the required properties of the cast products 32 obtained from the porous ceramic structure 22.

For example, the foamed synthetic resin body made of urethane resin, for example, is thermally decomposed at temperatures in the neighborhood of 400° C., and the unfired ceramic material applied to the porous network structure of the resin is fired generally at a temperature of 1300° C. or higher. Accordingly, the entire mass of the urethane resin disappears due to thermal decomposition at the end of a firing operation for about 24 hours.

In the porous ceramic structure 22 thus prepared, the multiple hollow members 34 concatenated with each other constitutes the framework having a three-dimensional network, wherein the continuous capillary system consists of the capillaries 36 left within the bodies of the linked hollow members 34, as indicated in FIG. 2. Generally, the porous ceramic structure 22 has a porosity within a range of about 60–90%, and the length of each side of each hollow member 34 is approximately 0.1–0.4 mm. However, this length varies depending upon the total number of the hollow members 34 per unit volume of the structure 22. The continuity of the capillaries 36 formed within the hollow members 34 of the porous ceramic structure 22 can be confirmed in the following manner, for example. Initially, gypsum is poured into the foamed body of urethane after the thin film of the resin closing the void of each member 34 has been removed. Then, the gypsum is dried and fired to thermally decompose the urethane foam, whereby small holes or capillaries are formed within the formed gypsum structure. Subsequently, an aluminum melt is poured into the holes in the gypsum structure. After the aluminum melt is solidified, the gypsum is removed. As a result, a continuous three-dimensional network structure of aluminum can be obtained. This continuous network of aluminum shows the existence of the continuous capillary passageway system (36) formed within the framework of the porous ceramic structure 22 used according to the present invention.

After the thus constructed porous ceramic structure 22 has been properly set in the mold cavity 20 as previously described, the molten metal 26 having a controlled chemical composition according to the desired properties of the cast product 32 is poured into the cavity 20. While an ordinary composition of cast iron or steel is generally used for the molten metal 26, various other compositions of metals such as copper alloy and aluminum alloy may be employed, according to the desired materials of the end product 32 produced according to the present invention.

In the present embodiment, the molten metal 26 is delivered to the mold cavity 20 through the gate 30, the runner 16, and the reservoir 24 which are formed in the casting mold 10. The delivered molten metal 26 fills the continuous space or volume which is left outside the three-dimensional framework of the porous ceramic structure 22 i.e., which is defined by the outer surfaces of the hollow members 34. As the supply of the molten metal 26 is continued, the level of the molten metal 26 reaches the feedheads or risers 18. At this time, the pouring operation is completed.

Although both ferrous and non-ferrous metals may be used as the metal melt 26, it is desirable that the temperature of the melt 26 when poured into the gate 30 be somewhat higher than that in an ordinary casting operation, in order to avoid development of cementite at the corners of the cast product or at the thin-walled portions of the cast products, because the delivered melt 26 inevitably cools upon contact with the wall surfaces of the mold 10, and the cooling tendency is increased due to the presence of the porous ceramic structure 22 within the cavity 20. It is noted that the total volume of the feedheads or risers 18 is determined so as to supply a suitable amount of additional metal into the cavity 20 as the casting solidifies and shrinks, and to thereby assure uniform feeding of the molten metal 26 throughout the continuous space left within the porous ceramic structure 22.

The reservoir 24 shown in FIG. 1 is provided to permit even delivery of the molten metal 26 to the hollow members 34 at different positions of the ceramic porous structure 22, thereby assuring uniform filling of the local portions of the continuous space within the structure 22. The volume and location of the reservoir 24 are determined depending upon the shape, size, material and other parameters of the cast product 32 to be produced. The solidified metal mass cast in the reservoir 24 is cut off, generally by a suitable cutting operation, after the entire cast mass has been solidified and removed from the mold 10.

The cast product 32 is thus obtained. This cast product 32 consists of an integral composite structure in which a cast metal mass 40 fills the local portions of the continuous three-dimensional space network defined by the mutually concatenated hollow members 34 of the porous ceramic structure 22, as shown in FIG. 3. Namely, the composite structure consists of the network of the ceramic material, and the cast metal mass 40 as matrix in which the ceramic network is embedded. In this connection, it is very important to note that the capillary 36 formed within the body of each hollow member 34 of the porous ceramic structure 22 is closed, as indicated in FIG. 2. Therefore, the molten metal 26 will not enter the continuous capillary passageway system of the ceramic structure 22 during a casting process. For this reason, the continuous capillary passageway system consisting of the mutually communicating capillaries 36 remains even after the continuous space outside the hollow members 34 is filled with the cast metal 40.

After the cast metal 40 has been solidified in the mold 10, the entire cast assembly is removed from the mold 10, and is subjected to necessary treatments, such as cooling, cleaning by a shot blast or other method, and surface finishing by a grinder, as performed on an ordinary casting. The portion of the cast assembly which corresponds to the reservoir 24 is cut off, as indicated above, whereby the desired cast product 32 is obtained as a fluid-permeable article as shown in FIG. 5. During the finishing operation by cutting or grinding on the cast product 32, a surface 38 of the cast product 32 is exposed as indicated at 38 in FIG. 3. Consequently, the capillaries 36 formed within the hollow members 34 of the embedded porous ceramic structure 22 are exposed on the surface 38, as shown in FIG. 4. In essence, the obtained cast product 32 is subjected to a cutting, grinding or other operation to remove a small amount of the material from a surface of the cast product, so that the continuous three-dimensional capillary passageway system consisting of the continuous capillaries 36 is exposed in at least a portion of the exposed outer surfaces of the cast product 32. This capillary passageway system (36) enables the cast product 32 of FIGS. 4 and 5 to serve as an article which exhibits a desired characteristic of fluid permeability.

While the cast metal 40 in the cast product 32 according to the invention is shown as segments separated from each other in the two-dimensional cross sectional views in FIGS. 2 and 3, it is to be understood that the hollow members 34 forming the three-dimensional network structure of the porous ceramic structure 22 are concatenated with each other, and consequently the cast metal 40 in which the hollow members 34 are embedded is a continuous three-dimensional structure.

Although the cast product as one form of the fluid-permeable article according to the invention, and the method of producing the cast product have been described in detail as the presently preferred embodiments of the invention, it is to be understood that the invention is not limited to the precise details of the illustrated embodiments.

In the illustrated method, the ceramic porous structure 22 is prepared by using a foamed body of a synthetic resin having a three-dimensional network structure. However, such a ceramic porous structure may be equally suitably prepared by using other forms made of a material which can disappear by firing at an elevated temperature. For example, a ceramic material is applied to a comb-like body or a structure having a multiplicity of parallel, spaced-apart needles which extend from one face of its base. In this case, too, the ceramic material deposited so as to surround the needles is fired, so that the obtained porous structure has passages corresponding to the burned-out material.

While the cast metal product has been illustrated, a fluid-permeable article according to the present invention may be obtained by using a plastic or glass material, and even a ceramic material, as a matrix material in which the porous ceramic structure is embedded. In either case, the continuous space left in the three-dimensional network of the porous ceramic structure is filled with a mass of such a plastic, glass or ceramic material, so that the filler cooperates with the porous ceramic structure to provide an integral fluid-permeable composite structure. In the case where a ceramic material is used to fill the space within the porous ceramic structure, the ceramic material must be fired.

It will be obvious that the present invention may be embodied with various other changes, modifications and improvements, which may occur to those skilled in the art, without departing from the spirit of the invention.

To further clarify the concept of the present invention, several preferred applications of different fluid-permeable articles according to the invention will be illustrated.

Figure 6:
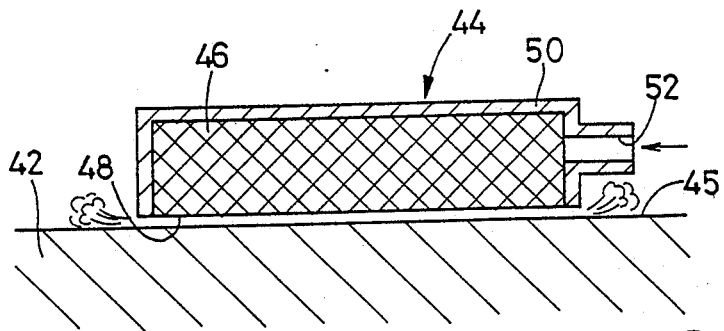
FIGS. 6 through 9 are cross sectional views illustrating various applications of the fluid-permeable cast article according to the present invention.

Referring to FIG. 6, there is shown one form of a fluid-permeable article adapted to be used as a pneumatically floating or levitating table 44 for a machine tool.

In FIG. 6, reference numeral 42 designates a stationary base of the machine tool, which has a flat upper surface 45 on which the pneumatically floating or levitating table 44 rests.

This floating table 44 includes a fluid-permeable cast article 46 produced according to a method as described above, such that a porous ceramic structure is embedded in a mass of cast metal. The fluid-permeable article 46 has a continuous capillary passageway system formed therein. As indicated in FIG. 6, the floating table 44 further includes a fluid-tight covering 50 which covers the outer surfaces of the fluid-permeable article 46, except for its lower surface 48. For example, the covering 50 is cast integrally with the article 46. In this arrangement, the continuous capillary passageway system of the fluid-permeable article 46 is open only in the lower surface 48. The covering 50 is formed with an air inlet 52 which communicates with one of opposite side surfaces of the article 46, and consequently communicates with the capillary passageway system within the article 46.

In the present pneumatically floating table 44, the air inlet 52 is connected to a suitable compressed air source, so that a compressed air blown into the capillary passageway system of the floating table 44 through the air inlet 52 is gushed from the lower surface 48 and impinges against the upper surface 45 of the stationary base 42. Thus, the floating table 44, which is adapted to support a workpiece on its upper surface, is capable of hovering or levitating above the stationary base 42.

A known pneumatically floating base is generally manufactured by casting a plate-like member, and boring a multiplicity of small passageway holes in the cast member such that the passageway holes communicate with each other and are open in the lower surface of the cast member. To the contrary, the floating table 44 can be manufactured with increased productivity and reduced cost, by utilizing the fluid-permeable article 46 according to the present invention. Further, since the passageways formed in the fluid-permeable article 46 are evenly open over the entire area of the lower surface 48, the operating characteristic of the floating table 44 is significantly improved.

Figure 7:
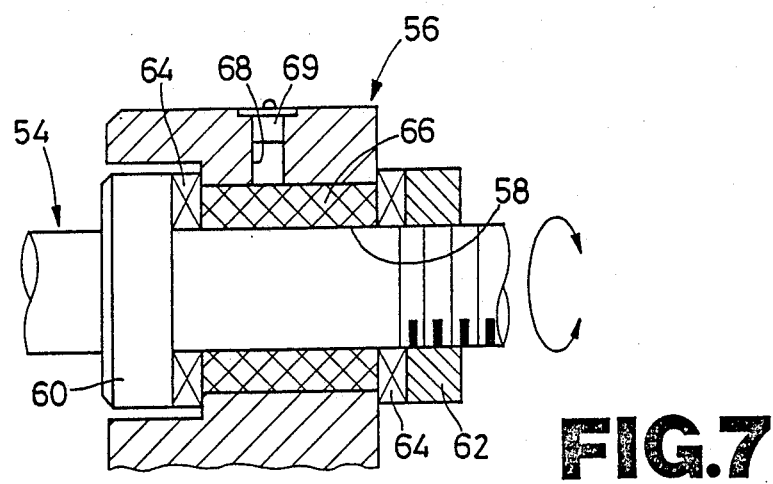

FIG. 7 shows another embodiment of the present invention using a modified form of a fluid-permeable article 66 which will be described.

In this embodiment, the fluid-permeable article 66 according to the present invention is used as a bearing member incorporated in a bearing device 56 for supporting a shaft 54, as shown in the figure, such that the shaft 54 is rotated about its axis by an external drive force. The fluid-permeable bearing 66 has a bore 58 through which the shaft 54 extends. The shaft 54 has an integral flange portion 60, which cooperates with a nut 62 to retain the shaft 54 rotatably and axially immovably with respect to the bearing 66. In FIG. 7, reference numeral 64 designates a pair of thrust bearings.

The fluid-permeable article 66 as the bearing 66 built in the instant bearing device 56 incorporates a porous ceramic structure which has a continuous capillary passageway system formed therein according to the principle of the present invention as described above. The passageway system is open in the inner bearing surface of the bearing 66 which defines the bore 58 and frictionally contacts the shaft 54.

The bearing device 56 is provided with a lubricant reservoir 68 which is open in its outer circumferential surface, and which communicates with the passageway system of the fluid-permeable bearing 66. A lubricant in the reservoir 68 is fed into the passageway system of the bearing 66. Reference numeral 69 in FIG. 7 indicates a removable cap for closing the reservoir 68.

In the present bearing device 56, the lubricant is held in the capillary passageway system in the fluid-permeable bearing 66, in a suitable state due to the capillary action. The thus reserved lubricant in the bearing 66 is supplied to the bearing surface 58 at an appropriate feed rate, due to friction heat and pumping action which occur during rotation of the shaft 54, so that the shaft 54 is adequately lubricated for smooth rotation relative to the bearing 66.

Further, the instant bearing device 56 is also advantageous for its significantly improved wear resistance. More specifically described, the ceramic material of the porous ceramic structure incorporated in the fluid-permeable bearing 66 is exposed on the bearing surface 58 such that the ceramic material is evenly distributed in the form of mutually spaced-apart dots.

Figure 8:
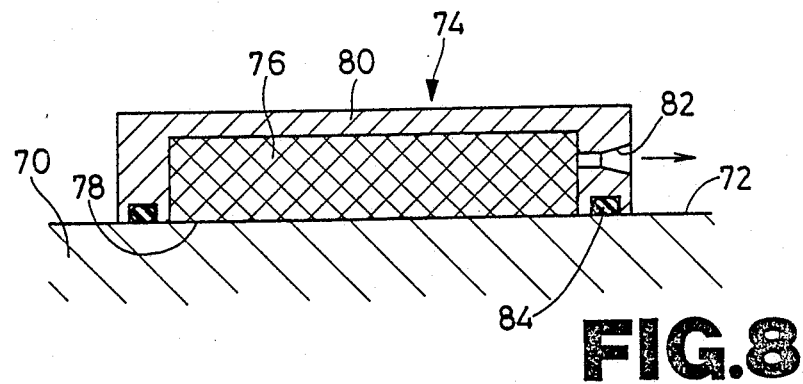

FIG. 8 shows a further embodiment of the invention using a fluid-permeable cast article 76 built in a pneumatically clamped table 74 for a machine tool.

In the figure, reference numeral 70 indicates a stationary base of the machine tool having an upper flat surface 72 on which the pneumatically clamped table 74 rests.

Like the fluid-permeable article 46 used in the pneumatically floating table 76 of FIG. 6, the fluid-permeable article 46 used in the instant pneumatically clamped table 74 is a cast product produced according to the method of the present invention, which includes a porous ceramic structure having a continuous capillary passageway system. The table 74 further includes a fluid-tight cast metal covering 80 which covers the fluid-permeable article 76, except for its lower surface 78. The metal covering 80 is formed with a suction port 82 which communicates with one of opposite side surfaces of the article 76 and consequently the passageway system formed in the article 76. Reference numeral 84 designates a sealing member provided on the lower surface of the covering 80, so as to surround the fluid-permeable article 76, in order to maintain fluid tightness between the covering member 80 and the upper surface 72 of the stationary base 70.

The suction port 82 of the instant table 74 is connected to a suitable vacuum source so that the table 74 may be sucked onto the upper surface 72 of the base 70, due to a reduced pressure within the passageway system which is open in the lower surface 78 of the fluid-permeable cast article 76. Thus, the table 74, which is adapted to support a workpiece on its upper surface, is pneumatically clamped onto the base 70.

The instant table 74 can also be manufactured with increased productivity and reduced cost, by utilizing the fluid-permeable article 76 according to the present invention, as compared with a conventionally available air-claimped table which generally uses a cast plate in which are formed a number of small passageways such that the passageway holes communicate with each other and are open in the lower surface of the cast member. Further, the passageways formed in the fluid-permeable article 76 are evenly open over the entire area of the lower surface 78, whereby the operating characteristic of the pneumatically clamped table 74 is significantly improved.

Figure 9:
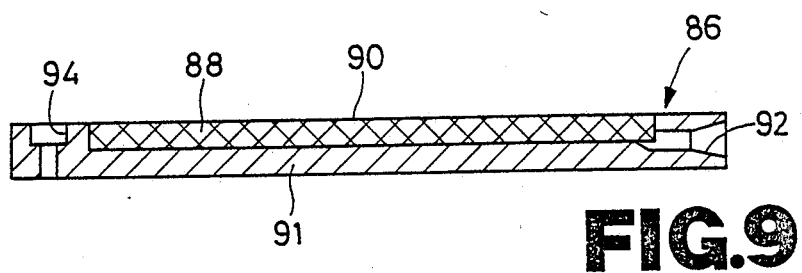

Referring next to FIG. 9, there is illustrated a further modified form of a fluid-permeable cast article 88 according to the present invention.

This cast article 88 is used for a plate 86 which is attached to a suitable support structure and which is adapted to support a sliding table. Described in more detail, the cast article 88 used for the plate 86 is a fluid-permeable cast product incorporating a porous ceramic structure embedded in the cast material, according to the principle of the present invention as previously described. The fluid-permeable cast article 88 has a continuous capillary passageway system formed in the porous ceramic structure, such that the passageway system is open only in an upper sliding surface 90 of the cast article 88. The plate 86 includes a fluid-tight covering 91 made from a metal casting, for example, which covers the outer surfaces of the fluid permeable cast article 88, except for its upper sliding surface 90. The covering 91 is provided, at one of its side surfaces, with a lubricant feed hole 92 which communicates with the passageway system of the fluid-permeable cast article 88. In the figure, reference numeral 94 designates a hole for a fastener used to secure the plate 86 to the support structure.

In the present plate 86, a lubricant introduced through the feed hole 92 is fed into the capillary passageway system formed within the fluid-permeable article 88, and is suitable delivered to lubricate the upper surface 90 which functions as a sliding surface of the plate 86. The thus constructed plate 86 is lubricated by a properly controlled amount of lubricant, evenly over the entire area of the sliding surface 90.

Further, since the ceramic material of the fluid-permeable cast article 88 of the present plate 86 is exposed on the sliding surface 90 in the form of mutually spaced-apart dots, the wear resistance of the sliding surface 90 is effectively increased, whereby the initial accuracy of the sliding surface 90 may be maintained for a prolonged period of time.

It follows from the foregoing description that the fluid-permeable article constructed according to the present invention may be advantageously utilized for a wide range of applications, in place of porous components conventionally employed in various fields of technology.

For instance, it is possible to utilize the instant fluid-permeable article as a heating or cooling member, by introducing a cold or hot fluid into the capillary passageway system formed within the framework of the porous ceramic structure embedded in the article. Further, the instant fluid-permeable article can serve as a filter or catalyst, by utilizing the passageway system formed therein.

What is claimed is:

1. A method of producing a fluid-permeable article which permits a fluid to pass therethrough, comprising the steps of:
   preparing a casting mold having a cavity;
   preparing a porous ceramic structure consisting of a multiplicity of hollow members which are made of a ceramic material and which are concatenated with each other so as to form a framework having therein a continuous capillary passageway system, said porous ceramic structure having a continuous space which is formed outside said framework and which is defined by outer surfaces of said hollow members;
   placing said porous ceramic structure in position within said cavity of said casting mold;
   pouring a molten metal into said cavity so as to fill said continuous space formed outside framework of said porous ceramic structure, and allowing solidification of a mass of the poured molten metal within said continuous space, together with a mass of the molten metal surrounding said porous ceramic structure within said cavity, to thereby form a cast product as said fluid-permeable article wherein said porous ceramic structure is integrally embedded within the mass of the solidified cast metal, with said continuous capillary passageway system left within said framework of said porous ceramic structure; and
   forming an inlet and an outlet for said continuous capillary passageway system in exposed surface portions of said cast product to permit fluid to pass therethrough.

2. A method according to claim 1, wherein said framework of said hollow members consists of a three-dimensional network of said ceramic material.

3. a method according to claim 2, wherein said step of preparing a porous ceramic structure comprises the steps of:

preparing a foamed body of a synthetic resin having a three-dimensional porous network structure;

applying an unfired ceramic material to said foamed body, so as to surround said three-dimensional porous network structure; and firing said unfired ceramic material while burning out said porous network structure of said synthetic resin, so that said three-dimensional network of said framework of said porous ceramic structure is formed by the fired ceramic material, such that said continuous capillary passageway system corresponds to the burned-out porous network structure of the synthetic resin.

4. A method according to claim 1, wherein the step of forming the inlet and outlet for said continuous capillary passageway system comprises cutting said cast product.

* * * * *